United States Patent Office 3,728,174
Patented Apr. 17, 1973

3,728,174
GELATIN EXPLOSIVE CONTAINING HOLLOW RESINOUS PLASTIC SPHERES
Walter L. Reinhart, Westtown Township, Chester County, Pa., assignor to Atlas Chemical Industries, Inc., Wilmington, Del.
No Drawing. Continuation-in-part of application Ser. No. 458,973, Sept. 28, 1954. This application Nov. 2, 1955, Ser. No. 544,579
Int. Cl. C06b 1/04
U.S. Cl. 149—21    16 Claims This application is a continuation in part of application Ser. No. 458,973 filed Sept. 28, 1954, now abandoned.

The present invention relates to improvements in gelatin explosives suitable for use under conditions of high pressure, such as, for example, the hydrostatic heads which are encountered in seismic prospecting and underwater blasting.

It has long been appreciated that gelatin explosives have a tendency to become insensitive when subjected to protracted pressure, and numerous means have been proposed for prolonging the sensitivity of gelatin exposives under such conditions. Usually, these means have been provided by extra ingredients included in the formulae, or by alteration of the form of conventional ingredients.

Hill, Pat. No. 1,778,718, according to which the sodium nitrate ingredient of gelatin dynamite is included in the form of hollow pellets, exemplifies one expedient which has been used for some time.

A further improvement in pressure resistance has been brought about by the invention of Pat. No. 2,674,526 of which the present inventor was the applicant. This patent discloses the use of hollow pellets of sulfur as one of the ingredients.

In accordance with the present invention, it has been found that the pressure resistance of gelatin explosives may be most desirably increased by the inclusion in their formulae of small quantities of small hollow resinous plastic pellets.

The small amount of these pellets which is required to effect sensitivity retention under pressure is a particular advantage obtained from their use. Useful resistance to pressure effects may be obtained when as little as 0.1 percent of the weight of the explosive is made up of small hollow resinous plastic pellets. On the other hand, the use of more than about 20 percent by weight of the small hollow resinous plastic pellets cannot be expected to produce increased advantages.

The usually preferred range of quantity of the resinous plastic pellets lies between about 0.3 percent by weight and about 3.0 percent by weight of the gelatin explosive composition. These amounts are, in general, considerably less than those necessary with other additives previously suggested for improving the pressure resistance of gelatin explosives.

Because hollow resinous plastic pellets somewhat larger than will pass a U.S.S. No. 8 screen have been found ineffective to improve the pressure sensitivity of gelatin explosives, it is preferred that the pellets used in accordance with the present invention pass a screen of that mesh size.

Pellets having a particle size of the order of from 0.0083 to 0.0002 inch in diameter have been found eminently useful in the invention.

It is apparent that resinous plastic materials of any convenient composition are useful in the invention. The most important requirement is that the pellets be hollow and sufficiently small. The resinous plastic material employed should, of course, be one that is not dissolved or destroyed, prior to use, by other ingredients of the explosive composition as, for example, nitroglycerin or nitrocotton.

Such pellets may be prepared by passing a liquid resinous plastic through a spray drying tower and curing the resultant droplet. Any suitable setting resin may be used. As examples may be given phenol-formaldehyde resins and urea-formaldehyde resins.

The hollow resinous plastic pellets designated as BK 11930, which are available from the Union Carbide and Carbon Corp. are one example of suitable pellets. These particular pellets are used under the trademark "Microballoons" as an evaporation retardant for oil tanks. "Microballoons" are hollow, thin-walled, pellets of "Bakelite" phenol-formaldehyde having diameters generally within the range of 0.0002 to 0.0036 inch, and having, in the aggregate, a bulk density of about 8.7 pounds per cubic foot. As prepared, these pellets are nitrogen filled.

Another example of specific pellets are those similarly prepared from urea-formaldehyde resin. These have a similar particle size and a density of about 1.7 pounds per cubic foot.

The present invention is applicable to gelatin explosive compositions in general. Gelatin explosives are made up of an explosive liquid nitric ester, such as nitroglycerin per se, or mixtures of nitroglycerin with nitro-glycols, nitrosugars, other nitro-polyhydric alcohols or the like (such mixtures are generally broadly referred to as "nitroglycerin" in the art), and a gelatinizing proportion of nitrocotton. This proportion usually falls between about 0.4 percent and about 7 percent by weight of the total explosive. Most gelatin dynamites includes, in addition, solid fuels such as corn flour, bagasse, wood pulp, walnut hulls, apricot pit pulp and the like; oxidizing salts such as sodium nitrate and ammonium nitrate; and sometimes, nitroaromatic compounds such as dinitro-toluene and tri-nitrotoluene. Also, small proportions of antacids such as chalk are usually employed for stabilization purposes.

As a general rule, the gelatin dynamites prepared in accordance with this invention contain, by weight, from about 20 percent to about 90 percent of nitroglycerin, up to about 20 percent of fuel, and up to about 60 percent of oxidizing agents.

The gelatin explosives of the invention may be formulated and mixed by conventional techniques familiar to those skilled in the art. Preferably, gelatin dynamites are formulated to provide adequate plasticity and packing characteristics and to produce proper oxygen balance.

In the following table are listed several preferred examples of the composition of gelatin dynamites made in accordance with the invention, and also several other compositions are included for comparative purposes. Also, the table includes the results of hydrostatic pressure tests on each of the compositions listed.

For these tests each of the compositions was made into a gelatin dynamite by conventional mixing techniques, and then was packed in 2 to 2¼" by 14–24" cartridges. One cartridge was primed at one end with a No. 8 seismograph electric blasting cap and joined at its other end to the end of another cartridge, or half of another cartridge in the case of the longer cartridges, by means of a cardboard sleeve. The joined cartridges were then loaded into a steel bomb about 3 inches in diameter and about 40 inches long. The bomb was then filled with water under a pressure equivalent to 300 feet of water and kept under water at that pressure for 24 hours. Three lead crusher cylinders, each about 2 inches in diameter by 4 inches in length were placed in a line with their flat ends upward, and each was capped with a steel capping plate about one inch thick and 3 inches square. Then while still under pressure the bomb was placed on top of the cylinders and capping plates. The crusher cylinders were so arranged that one was located near the primed end of the connected cartridges, the second was located near the center of the charge, and the third was located near the unprimed end of the charge. The effectiveness with which the detonation proceeded through the explosive (that is to say, the sensitivity of the explosive) was determined by the extent of compression of each of the leads after the bomb was fired.

The table follows:

TABLE

| | Example number | | | | | | |
|---|---|---|---|---|---|---|---|
| | 1 | 2 | 3 | 4 | 5 | 6 | 7 |
| Nitroglycerin, percent | 50.5 | 50.5 | 50.5 | 51.0 | 51.0 | 51.0 | 50.5 |
| Nitrocotton, percent | 1.8 | 1.8 | 1.8 | 1.3 | 1.3 | 1.3 | 1.8 |
| Ground sodium nitrate, percent | 30.2 | 30.2 | 30.2 | 17.0 | 17.0 | 17.0 | 30.2 |
| Coarse sodium nitrate, percent | | | | 15.0 | 15.0 | 15.0 | |
| Ground walnut hull meal, percent | 9.0 | 9.2 | 9.5 | 7.0 | 7.0 | 8.3 | 9.0 |
| Dry corn flour, percent | 2.0 | 2.0 | 2.0 | 2.0 | 2.5 | 2.0 | 2.0 |
| Ground wood pulp, percent | 5.0 | 5.0 | 5.0 | | | | 5.0 |
| Bagasse, percent | | | | 4.7 | 4.7 | 4.4 | |
| Chalk, percent | 1.0 | 1.0 | 1.0 | 1.0 | 1.0 | 1.0 | 1.0 |
| Phenol formaldehyde microballoons BK-11930, percent | 0.5 | 0.3 | | 1.0 | 0.5 | | |
| Urea formaldehyde microballoons UJOA-0100 | | | | | | | 0.5 |
| Pressure test compression, percent: | | | | | | | |
| Lead #1 | 56 | 59 | 36 | 53 | 41 | 31 | 48.4 |
| Lead #2 | 62 | 64 | 8 | 58 | 50 | 5 | 50.0 |
| Lead #3 | 67 | 67 | 0 | 53 | 52 | 0 | 51.6 |

What is claimed is:

1. A gelatin explosive including, in its formula, hollow resinous nitrogen filled plastic pellets which are not attacked by other ingredients of the explosive and are of a size such that they pass a U.S.S. No. 8 screen, said pellets being included in an amount between about 0.1% and about 3% by weight.

2. A gelatin explosive comprising nitroglycerin and nitrocotton and including hollow resinous nitrogen filled plastic pellets which are not attacked by other ingredients of the explosive and are of a size such that they pass a U.S.S. No. 8 screen, said pellets being included in an amount between about 0.1% and about 3% by weight.

3. A gelatin dynamite comprising nitroglycerin, nitrocotton, a solid fuel, an oxidizing salt, and hollow resinous nitrogen filled plastic pellets which are not attacked by other ingredients of the explosive and are of a size such that they pass a U.S.S. No. 8 screen, said pellets being included in an amount between about 0.3% and about 3% by weight.

4. A gelatin dynamite including in its formula hollow nitrogen filled pellets of phenol-formaldehyde resin of a size such that they pass a U.S.S. No. 8 screen, said pellets being included in an amount between about 0.1% and about 3% by weight.

5. A gelatin dynamite including in its formula hollow nitrogen filled pellets of urea-formaldehyde resin of a size such that they pass a U.S.S. No. 8 screen, said pellets being included in an amount between about 0.1% and about 3% by weight.

6. A gelatin explosive including, in its formula, nitrogen filled Microballoons in an amount between about 0.1% and about 3% by weight.

7. A gelatin explosive comprising nitroglycerin, and nitrocotton and including nitrogen filled Microballoons in an amount between about 3 percent and about 0.1 percent by weight.

8. A gelatin dynamite comprising nitroglycerin, nitrocotton, a solid fuel, an oxidizing salt, and nitrogen filled Microballoons in an amount between about 3 percent and about 0.1 percent by weight.

9. A gelatin dynamite comprising nitroglycerin, nitrocotton, a solid fuel, an oxidizing salt and nitrogen filled Microballoons in an amount between about 0.3 percent and 3.0 percent by weight.

10. A gelatin explosive comprising nitroglycerin and nitrocotton and including hollow resinous nitrogen filled plastic pellets which are not attacked by other ingredients of the explosive and are of a size between about 0.0002 inch and about 0.0083 inch in diameter, said pellets being included in an amount between about 0.1% and about 3% by weight.

11. A gelatin dynamite comprising nitroglycerin, nitrocotton, a solid fuel, an oxidizing salt, and hollow resinous nitrogen filled plastic pellets which are not attacked by other ingredients of the explosive and are of a size between about 0.0002 inch and about 0.0083 inch in diameter, said pellets being included in an amount between about 0.3% and about 3% by weight.

12. A gelatin dynamite including in its formula hollow nitrogen filled pellets of phenol-formaldehyde resin of a size between about 0.0002 inch and about 0.0083 inch in diameter, said pellets being included in an amount between about 0.1% and about 3% by weight.

13. A gelatin dynamite including in its formula hollow nitrogen filled pellets of urea-formaldehyde resin of a size between about 0.0002 inch and about 0.083 inch in diameter, said pellets being included in an amount between about 0.1% and about 3% by weight.

14. A gelatin dynamite composition comprising about from 20 to 90% by weight of nitroglycerin, about from 0.4 to 7% by weight of nitrocellulose, up to about 60% by weight of an inorganic oxidizing salt, and about from 0.1 to 3% by weight of the entire composition of a water and nitroglycerin insoluble polymerized thermosetting phenol-formaldehyde resin in the form of thin-walled, hollow balloons, said balloons having a bulk density of less than about 0.3 gram/cc. and a diameter between 0.0002 inch and 0.0083 inch, said gelatin dynamite composition having a bulk density greater than 1.

15. A gelatin dynamite composition comprising about from 20 to 90% by weight of nitroglycerin, about from 0.4 to 7% by weight of nitrocellulose, up to about 60% by weight of an inorganic oxidizing salt, and about from 0.1 to 3% by weight of the entire composition of a water and nitroglycerin insoluble polymerized thermosetting urea-formaldehyde resin in the form of thin-walled, hollow balloons said balloons having a bulk density of less than about 0.3 gram/cc. and a diameter between 0.0002 inch to 0.0083 inch, said gelatin dynamite composition having a bulk density of greater than 1.

16. A gelatin dynamite composition comprising about from 20 to 90% by weight of nitroglycerin, about from 0.4 to 7% by weight on nitrocellulose, up to about 60% by weight of an inorganic oxidizing salt, up to about 20% by weight of at least one combustible material selected from the group consisting of corn flour, bagasse, wood-pulp, walnut hulls, and apricot pit pulp, and about from 0.1 to 3.0% by weight of the entire composition of a water and nitroglycerin insoluble polymerized thermosetting urea-formaldehyde resin in the form of thin-walled, hollow balloons, said balloons having a bulk density of less than about 0.3 gram/cc. and a diameter between 0.0002 and 0.0083 inch, said gelatin dynamite composition having a bulk density of greater than 1.

References Cited
UNITED STATES PATENTS

| | | | |
|---|---|---|---|
| 1,778,718 | 10/1930 | Hill | 52—11 X |
| 2,365,170 | 12/1944 | Bitting et al. | 52—11 |
| 2,652,386 | 9/1953 | Wallman. | |
| 2,674,526 | 4/1954 | Reinhart | 52—13 |
| 2,671,400 | 3/1954 | Deusing et al. | 149—19 |

OTHER REFERENCES

Chemical and Engineering News, vol. 31, No. 49, Dec. 7, 1953, p. 5122.

BENJAMIN R. PADGETT, Primary Examiner

U.S. Cl. X.R.

149—2, 65, 69, 95, 102, 103, 110

CERTIFICATE OF CORRECTION

Patent No. 3,728,174                  Dated April 17, 1973

Inventor(s)   Walter L. Reinhart

It is certified that error appears in the above-identified patent and that said Letters Patent are hereby corrected as shown below:

Column 1, line 63, the word "partice" should read -- particle --.

Column 2, line 13, the word "droplet." should read -- droplets. --.

Column 2, line 20, the word "cil" should read -- oil --.

Column 2, line 39, the word "includes," should read -- include, --.

Column 4, line 53, Claim 13, the number "0.083" should read -- 0.0083 --.

Column 5, line 5, the word "on" should read -- of --.
(Claim 16)

Signed and sealed this 25th day of December 1973.

(SEAL)
Attest:

EDWARD M. FLETCHER, JR.
Attesting Officer

RENE D. TEGTMEYER
Acting Commissioner of Patents